United States Patent [19]

Wilson et al.

[11] Patent Number: 4,710,883

[45] Date of Patent: Dec. 1, 1987

[54] ELECTRONIC POSTAGE METER HAVING A STATUS MONITOR

[75] Inventors: Woody W. Wilson, Westport; Nathaniel G. Wadsworth, Oxford, both of Conn.

[73] Assignee: Pitney Bowes Inc., Stamford, Conn.

[21] Appl. No.: 710,898

[22] Filed: Mar. 12, 1985

[51] Int. Cl.⁴ .................. G06F 15/20; G06G 7/48
[52] U.S. Cl. ................................ 364/466; 364/464
[58] Field of Search ... 364/200 MS File, 900 MS File, 364/464, 466, 567

[56] References Cited

U.S. PATENT DOCUMENTS 4,301,507 11/1981 Soderberg et al. ............... 364/900
4,302,821 11/1981 Eckert et al. ..................... 364/900
4,591,976 5/1986 Webber et al. ................... 364/200

Primary Examiner—Errol A. Krass
Assistant Examiner—Danielle Laibowitz
Attorney, Agent, or Firm—Michael J. DeSha; David E. Pitchenik; Melvin J. Scolnick

[57] ABSTRACT

An electronic postage meter includes a microcomputer with an external timer for providing a periodic interrupt. At each interrupt, a monitor routine examines the sensors and switches for changes in status and a monitor word is formed in correspondence with the detected status. A queue of meter tasks is scheduled in accordance with the meter status, any changes in status, or after a selected time has passed.

7 Claims, 17 Drawing Figures

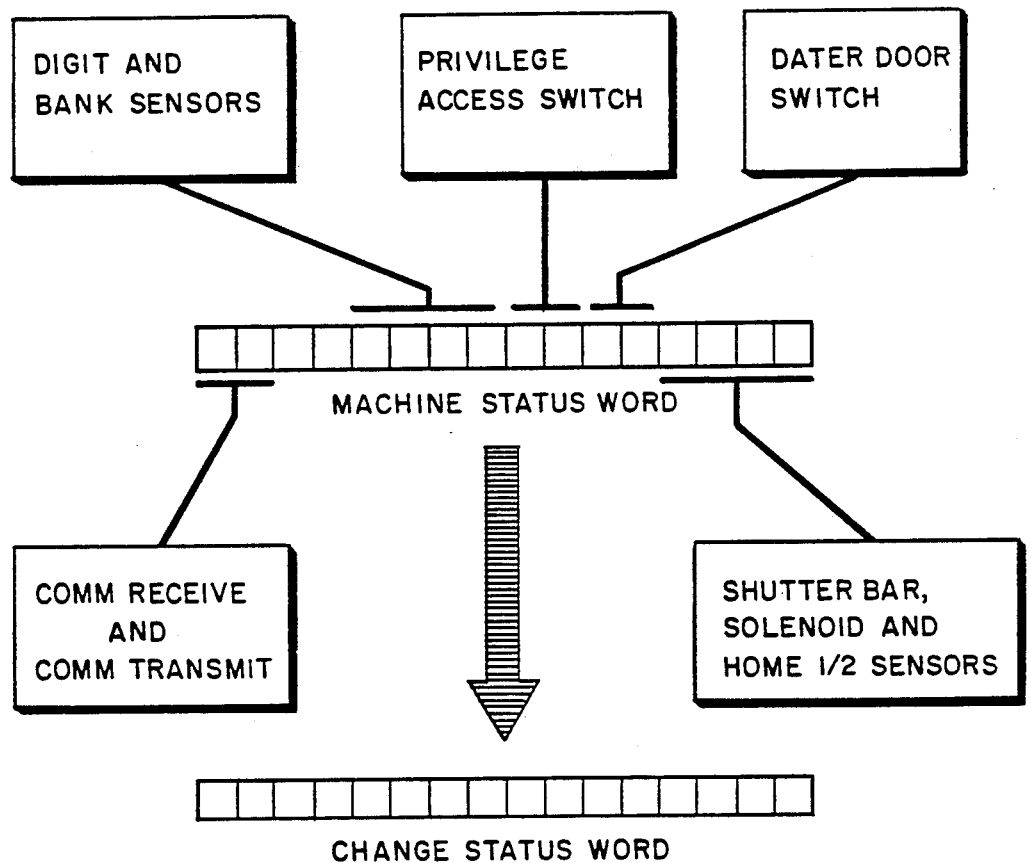

ELECTRONIC POSTAGE METER HAVING A STATUS MONITOR

BACKGROUND OF THE INVENTION

The invention relates to postage meters and more particularly to electronic postage meters of the type having a microprocessor for controlling the printing of value and accounting for such printing.

Devices of this type are generally known, and are discussed, for example in U.S. Pat. No. 3,978,457. This patent discloses a system for a postal meter which includes a keyboard for the manual introduction of data corresponding to the postage to be printed and a Random Access Memory for real time operation. Data is stored in a Nonvolatile Memory upon power down and read into the Random Access Memory upon power up. U.S. Pat. No. 4,301,507 discloses an improvement in an electronic postage meter having two or more units that are each provided with computer control and describes a means for providing communication between units as well as with peripheral devices.

U.S. Pat. No. 4,481,604 describes, as an alternative memory system, a redundant memory system in which for each operation identical data is stored respectively in two identical CMOS battery-backed nonvolatile memories.

While the meters herein described each work well under normal conditions, there have been found to be significant numbers of times when operational anomalies have occurred. Even is such transient events occur only very irregularly, there are still chances that postal value may be lost or that other unknown conditions may cause malfunctions in the operation of the postage meter. In some cases it may be that under unanticipated circumstances the routines which are utilized for one task may have unintended consequences for other operations of the postage meter. When such anomalies occur, in these conventional postage meters the machine typically sets a fatal error which in turn requires the meter to be taken out of service. In addition to the obvious problem of meter down-time it has also been found in these meters that there may be no way to reconstruct the events that have occurred in order to recreate the circumstances of the malfunction or to determine if there was an undetected software error.

The conventional postage meters described in these patents normally continually cycle through various "idle" or other "housekeeping" routines while awaiting the occurrence of an event or request which will command the microcomputer program to perform a particular operation.

It has been found that many of the problems occurring in these meters may be alleviated or eliminated in a meter in accordance with the invention in which the status of the meter is monitored and the monitored data is used to schedule the tasks to be performed by the meter.

It is therefore an object of the invention described herein to provide a method and apparatus for monitoring the status of the meter to determine at each instant the condition of the meter with respect to inputs, outputs, meter switches and sensed internal conditions.

It is a second object of the invention to provide a meter operation in which each of the various tasks comprising the operation of the meter are independently actuable in a sequence or queue determined from monitoring the status of predetermined inputs, outputs, switches or sensed internal conditions.

It is a further object of the invention to provide the capability in an Electronic Postage Meter for the meter itself or for the passage of time to determine when a particular task should be scheduled for operation.

SUMMARY OF THE INVENTION

In accordance with the invention the postage meter includes a timer, preferably external to the microcomputer, for providing a periodic interruption of the routine being executed. Upon such interruption the microcomputer shifts to a monitor routine which examines the meter elements sensors, inputs and outputs and determines any changes in status. For best results, at each interrupt a Machine Status Word is formed in correspondence with the detected status of the monitored elements. The new Machine Status Word is compared with the previous Machine Status Word to generate a Change Status Word for indicating any changes that have occurred. The new Machine Status Word is stored in place of the previous Machine Status Word. A queue of the independent tasks which comprise the operation of the postage meter are scheduled as required in accordance with the meter status, any changes in status or after a selected length of time has passed. Preferably each task is identified by a Task Control Block which stores the task's status. If a predetermined time out is desired, the predetermined time is set as a part of a Task Control Block identifying the task and is decremented each time the monitor routine is commanded until such time as the timer decreases to zero and the task is again scheduled in the queue.

BRIEF DESCRIPTION OF THE DRAWING

In order that the invention will be more clearly understood, it will now be described in greater detail in conjunction with the drawing, wherein:

FIG. 4 which comprises

FIG. 5 is a graphical representation of the formation of the Machine Status Word; and FIG. 6, comprising

DESCRIPTION OF THE PREFERRED EMBODIMENT

Figure 1:
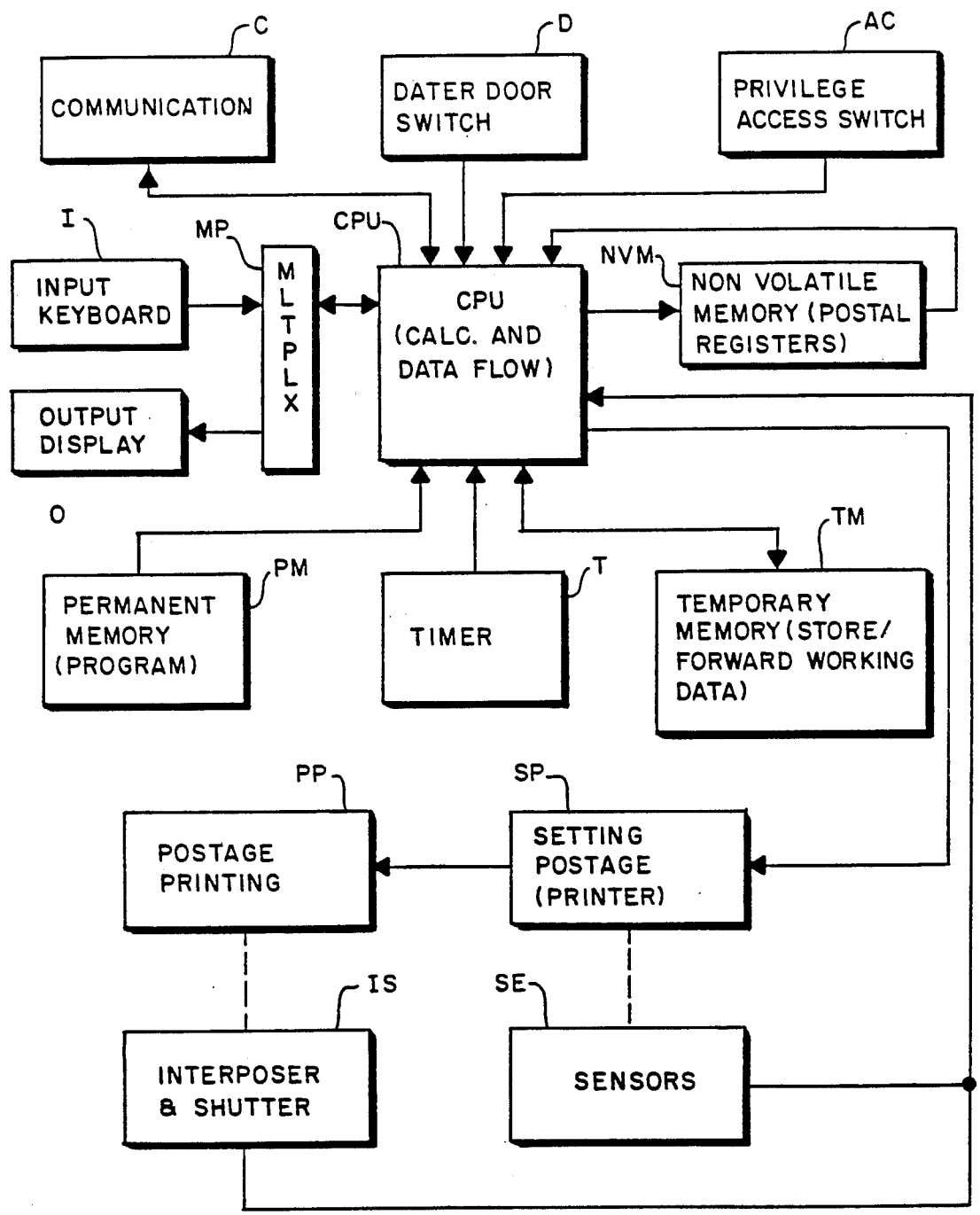
FIG. 1 is a simplified block diagram of a postal meter which may incorporate the system of the present invention.

FIG. 1 is a block diagram of an electronic postage meter incorporating the invention. Suitable meters in which the invention may be utilized are described in U.S. Pat. Nos. 3,978,457 and 4,301,507, the disclosures of which are specifically incorporated by reference. It will also be understood and appreciated that battery-backed memories such as described in U.S. Pat. No. 4,481,604 may also be suitably utilized in place of the nonvolatile memory and temporary RAM memory illustrated herein. Other nonvolatile memories having similar capabilities may be incorporated if desired.

A central processing unit CPU controls the calculations and data flow in the meter as is well known in the art. Data and commands are read from the input keyboard "I" and other data may be displayed as requested on display "O" in conventional manner. In addition data and commands may be received and transmitted through a communication interface shown at "C" as is more specifically described in U.S. Pat. No. 4,301,507 also incorporated herein by reference. Real time accounting is accomplished in a Random Access Memory TM with sensitive data being transferred to an NVM as illustrated or alternatively the NVM may be used directly as the real time data storage registers. It will be further appreciated that the Random Access Memory illustrated may be replaced by a nonvolatile memory. The CPU also communicates commands for setting the print wheels and for the printing of postage.

In typical meters there are switches such as the one shown as "D" associated with the "dater door" and "AC" for providing "privileged access", sensor outputs "SE" and "IS" associated with the position of the print wheels, interposer shutter bars and stepper motors which have outputs that are communicated to the CPU. In accordance with the invention, an external timer circuit "T" is incorporated to provide a periodic interrupt signal to the CPU. The external timer may be any conventional clock circuit, suitably crystal-controlled, to provide an output signal, conveniently every 2.5 milliseconds. It will be appreciated that other intervals are also contemplated and the invention is not limited to this precise interval.

Figure 2:
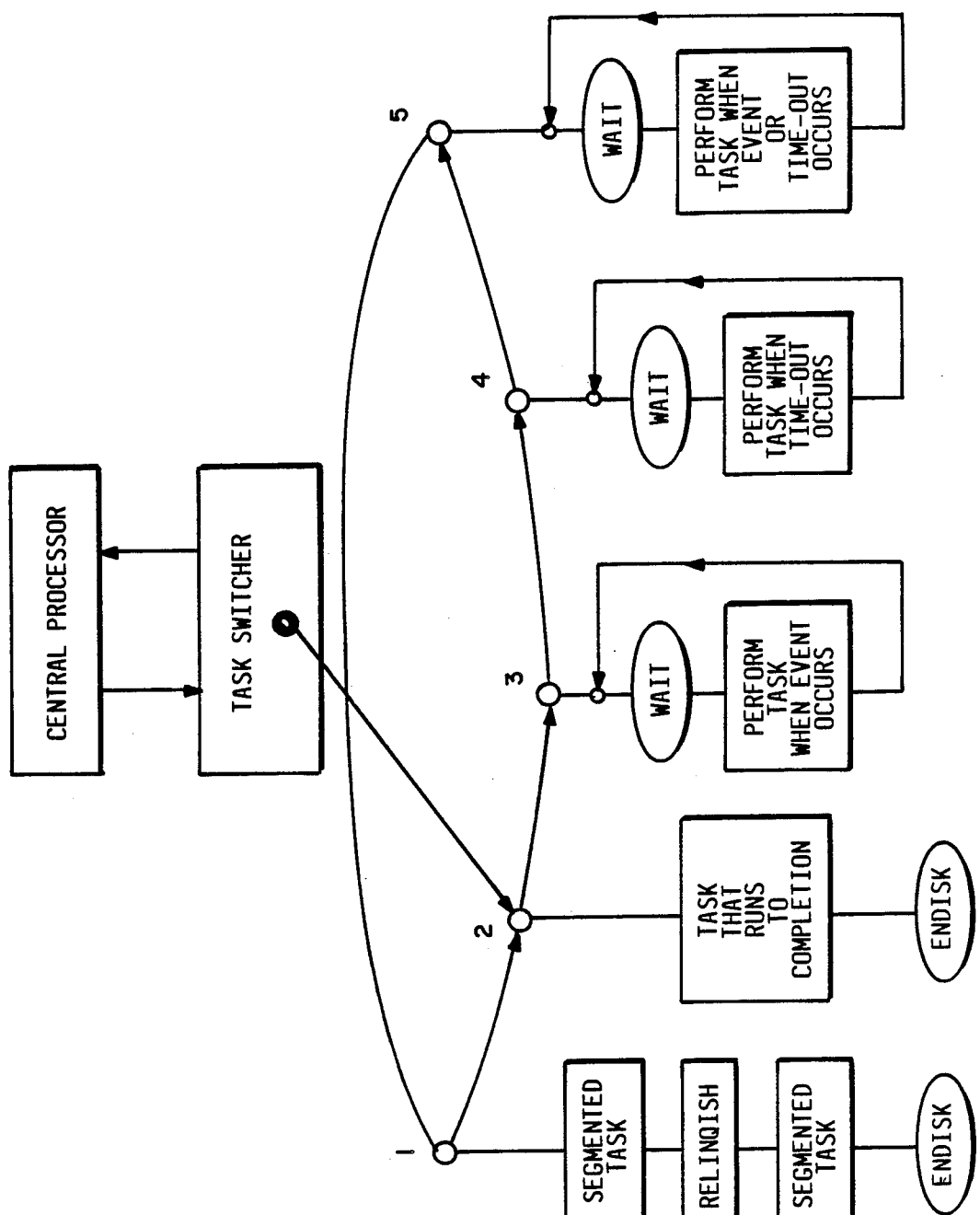
FIG. 2 is a graphical depiction of the task switching routine.

FIG. 2 illustrates the task switching routine in accordance with the invention. Turning now to FIG. 2, in accordance with the invention the task switcher proceeds to service tasks, conveniently in a "round-robin" fashion. Tasks that are "inactive" or "waiting" for an event are ignored by the task switcher. The first task encountered by the task switcher that needs to be serviced is granted control of the CPU. When all the tasks have been polled by the switcher, the polling cycle begins again.

When the task switcher finds a task that needs servicing, it passes control of the CPU to that task. This "active" task retains control of the CPU until an interrupt occurs or until the task "relinquishes" the processor. In the meter in accordance with the invention, the tasks are designed to quickly perform a particular function and then relinquish themselves to wait for an event to occur. This permits the next active task in the round-robin to gain the services of the processor. As illustrated, the available options allow a task to run to completion, to suspend itself, to permit interrupts to cause task switching and to enable or disable other tasks. It will be appreciated that priority levels among the tasks may also be assigned if required.

Figure 3A:
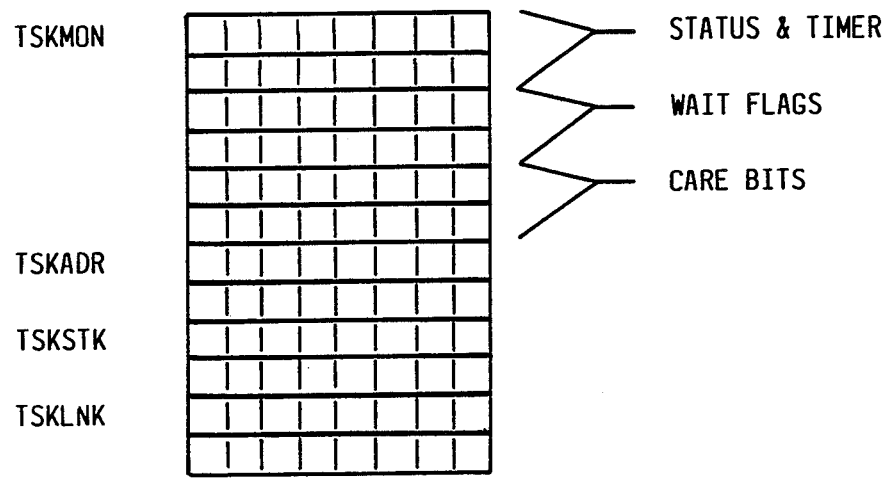
FIG. 3A is a graphical representation of a Task Control Block.
Figure 3B:
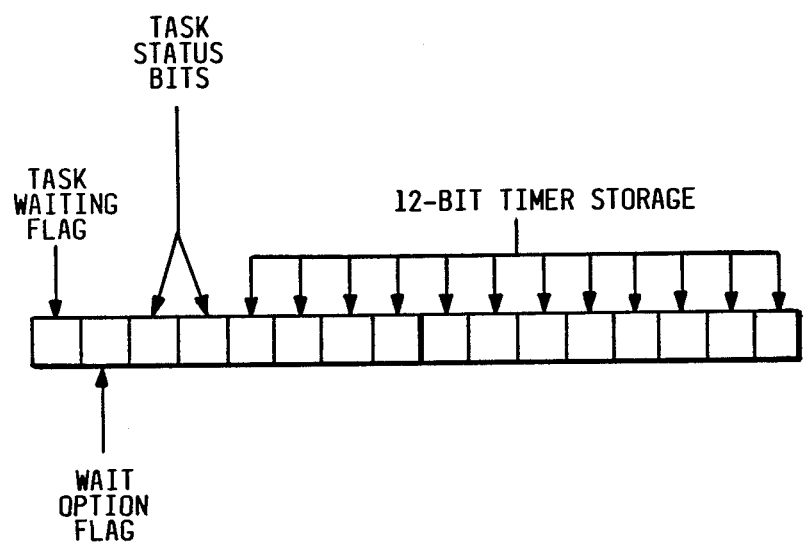
FIG. 3B is a graphical representation of the first word of the Task Control Block.

In accordance with the invention, each task controlled by the task switcher is assigned a multiple-byte Task Control Block (TCB) such as for example the one graphically illustrated in FIG. 3A. As seen in FIG. 3B, the first four bits of the first byte in a TCB are used by the task switcher in combination with the symbiotic monitor routine described below. These bits indicate whether the task is waiting for an event to occur, what type of event it is waiting for, and the status of the task, i.e. stopped, new, or active. The four bits may also conveniently be referred to as the Task Control Nibble (TCN).

Preferably, the remaining four bits in the first byte are the most significant bits of a timer and along with the eight bits of the next byte in the TCB constitute a twelve-bit timer value that can be set by a task when it enters a "waiting" state. This timer may be decremented by the monitor routine each 2.5 milliseconds. For best results, a timer value that is decremented to zero by the monitor routine causes the task to be activated. Thus a task could be waiting both for a specific event to take place, based on the status of the meter as well as for a default time period to expire. For best results, when a task does not utilize the timer, all of the timer bits in its TCB are set to zero when it goes to the suspended state described below. The monitor routine preferably will not decrement a timer whose value is zero.

In accordance with the invention and as illustrated in FIG. 3B, the next two bytes in the TCB contain event "wait" flags. For best results each bit will correspond to a particular machine element, i.e. sensor switch, input, output or the like. Depending on the options selected, the monitor routine can be directed to wait for a "change" in any of one or more sensors or to look for a particular set of sensor conditions. When the latter option is utilized, then preferably the next two bytes, that is bytes 5 and 6 of the TCB are used to indicate "care" and "don't care" positions. Suitably a zero in a bit position in bytes 5 and 6 means that the corresponding position in the "wait" flag bytes 3 and 4 is a "don't care" cell. A "one" means that the corresponding "wait" flag position is to be considered part of an event pattern that is being "looked for". Conveniently, the remaining six bytes of a TCB are used to store three two-byte address values, for example, the address where the routine for a task starts, the address where the task's stack pointer is to be located, and the address of the next Task Control Block.

In the routines in accordance with the invention, the task switching itself consists of having the task switching routine look at the TCN of the next Task Control Block. If the Task Control Nibble indicates that the task is inactive or if it is active but waiting, then that task is skipped over. The first task in this circular chain of Task Control Blocks that is marked as active and is not in the waiting state obtains the services of the processor. In accordance with the invention, once granted control of the microprocessor, a task owns the processor until it relinquishes it to the task switcher.

Figure 4A:
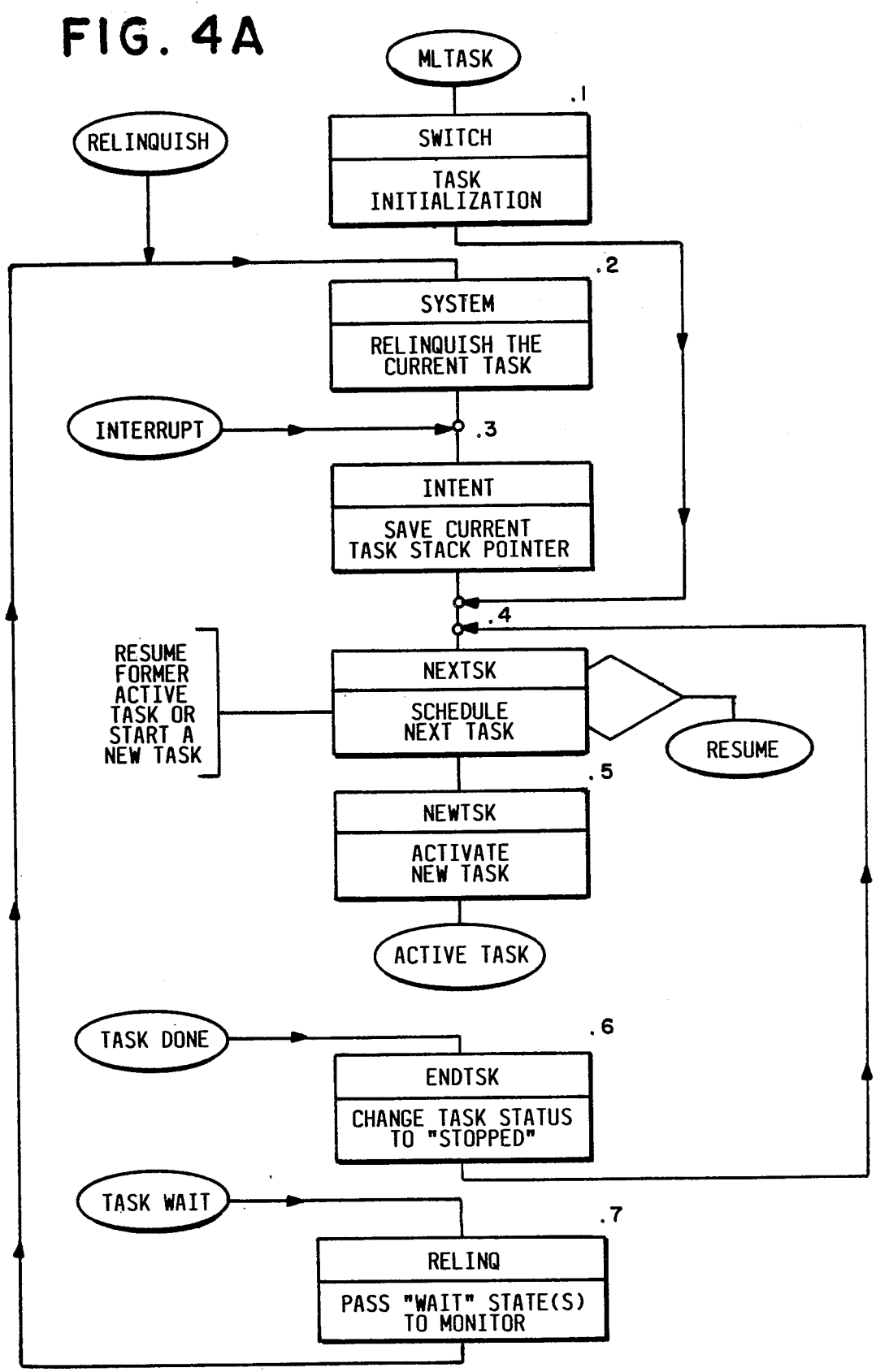
FIGS. 4A through 4H is a sequential set of flow charts illustrating the task switching routine for the electronic postal meter.

More specifically now, as illustrated in FIG. 4A the Task Switcher routine takes care of initializing all the Task Control Blocks when the system is initially activated, starting any new tasks, relinquishing tasks, and reactivating tasks once its conditions have been met.

Figure 4B:
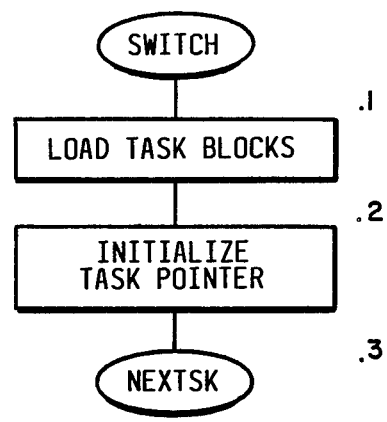

The first routine in the flow chart of the task switcher routine represents the initializing of the program upon "power-up" or "system reset" conditions. The routine SWITCH, FIG. 4B, sets up the Task Control Blocks to their desired initial states. For best results, it then further sets the task pointer to a state (N−1) so that, upon entry to the next task section, the task N will be the first task scheduled to be considered for activation. Then for each of the tasks one through N, it sets up the Task Control Blocks to contain the initial task status, that is, stopped, new or active, the starting address of the appropriate task routine, the initial address of the task-associated stack location and the link to the next Task Control Block, i.e. an address identifying the first byte of the next Task Control Block. The task pointer is then initialized to the address of task block (N−1). The routine jumps to begin the task scheduling operations described below.

Figure 4C:
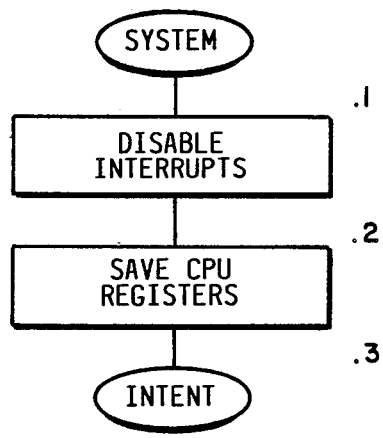
Figure 4D:
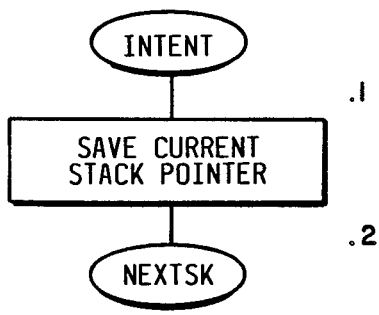

The routine SYSTEM, FIG. 4C, is utilized when an active task is to disable itself so that other tasks may have an opportunity to run. It is typically entered by a call from the RELINQUISH section of the Task Switcher. Interrupts are disabled and the CPU registers that are not to be disturbed in the currently active stack are saved. The routine then falls into the interrupt entry point. The routine Interrupt Entry Point (INTENT), FIG. 4D, enables the task switching which is to be initiated by the external interrupt. That is, the initial interrupt servicing routine will preferably have disabled further attempts at this point and will have saved the appropriate CPU registers. The current value of the stack pointer in the current Task Control Block is saved and the routine continues into its task switching procedures.

Figure 4E:
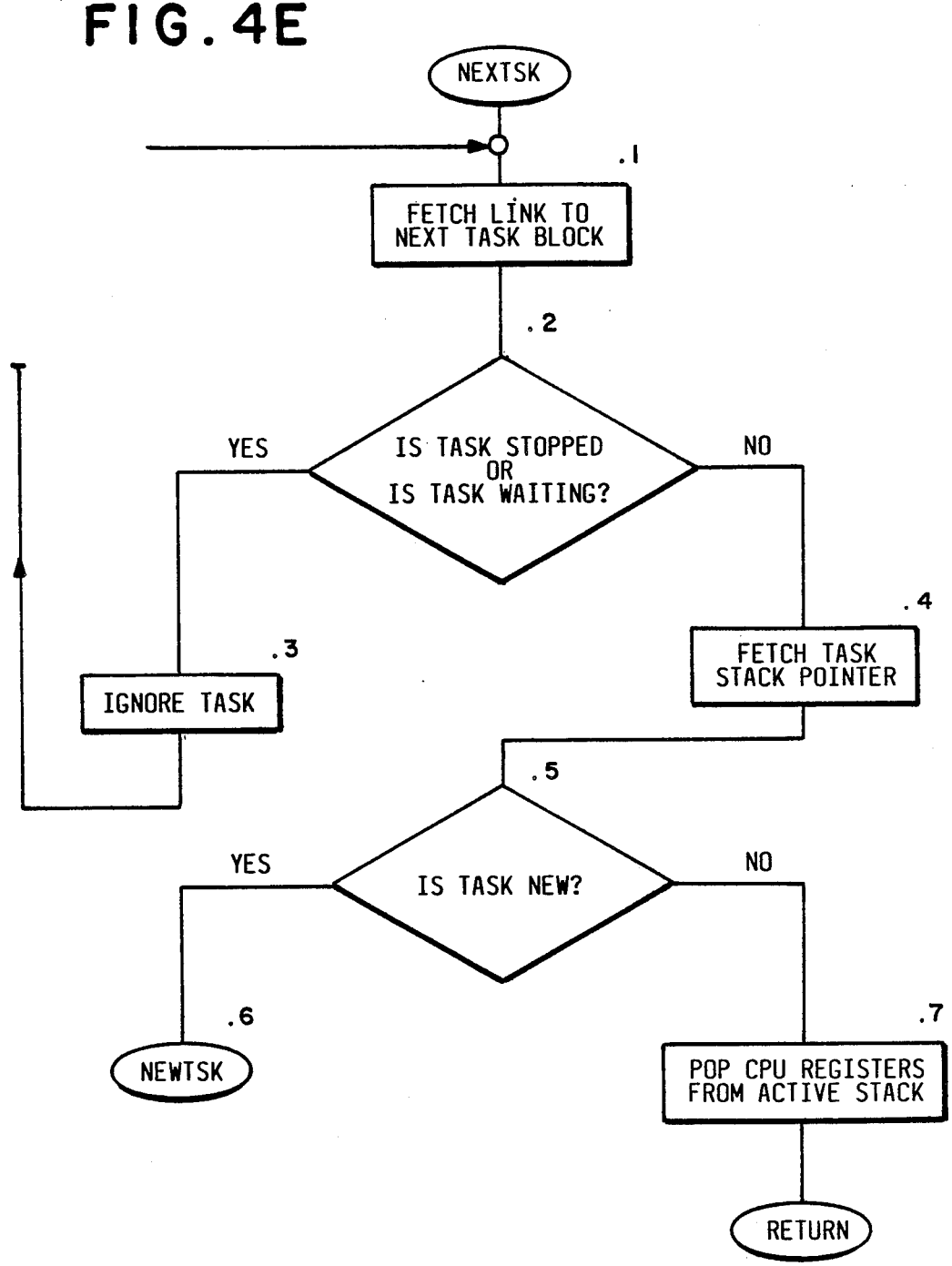
Figure 4F:
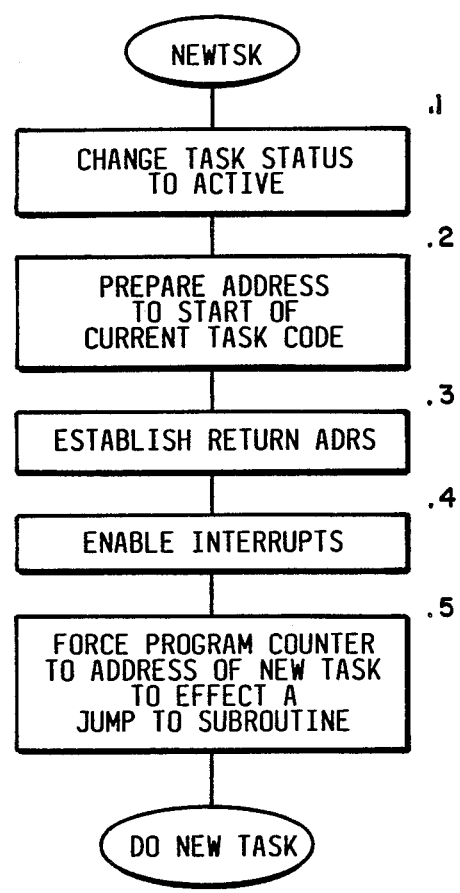

The NEXT TASK routine (NEXTSK) FIG. 4E schedules the next task in the sequence having status bits showing that it is either new or active. It does this by retrieving the link that is the address of the next Task Control Block. The task pointer is set to the next control block using this link. The status of the current task is checked by checking the contents of its task status byte and if the status is waiting or is stopped, it loops back to Fetch Link in the routine so that the current task is skipped. If neither of these events pertains, the current task stack pointer value is obtained. If the task is new, the routine jumps to the Active New Task (NEXTSK) FIG. 4F routine. Otherwise it is returned to the currently active task by popping the proper CPU register from the stack, enabling any interrupts and executing a Return instruction.

Turning now to the NEWTSK routine for activating a new task, the initial step is to cchange the current Task control Block status from "new" to "active" and then to set up the address of an END TASK (ENDTSK) as return address to which the routine is to exit when the task has been completed. An address of the location is set up where the task begins so it may be loaded into the program counter. The interrupt system is enabled so that the MONITOR may enter and the address where the code of the task begins is inserted into the program counter to effect a jump to the sub-routine at that address.

Figure 4G:
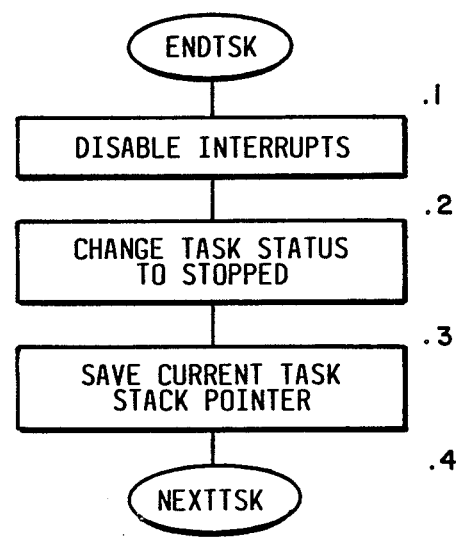

The END A TASK routine (ENDTSK) FIG. 4G removes any tasks that have been completed from further scheduling by the task switcher by changing their task status bits to "stopped". The current task stack status is altered by changing the task status byte in the current Task Control Block as discussed previously. The present value of the stack pointer in the current Task Control Blocks stack pointer is stored and the routine jumps to the next task.

Figure 4H:
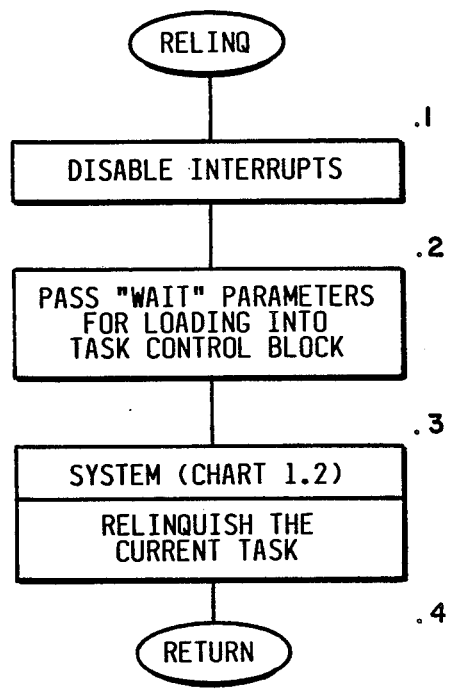

The RELINQUISH routine FIG. 4H suspends a task when the operation must wait for an event, a change in state, or for a time period to pass. The wait parameters are stored in the Task Control Block for use by the monitor routine as will be discussed below. A suspended task will be scheduled for resumption when the monitor ascertains that any condition that has been waiting for has been met. The wait status bit, desired timer value, "wait" flags as well as "care" bits from the suspending task are stored in the Task Control Block.

The task switcher SYSTEM is then called to suspend the current task.

For resuming a task after an event has occurred the routine returns to the suspended task when the MONITOR routine establishes that an event occurred or a time period expired by clearing the "wait" flag in the Task Control Nibble and the task switcher will reactivate the task.

Turning now to FIGS. 5 and 6, as mentioned previously and in accordance with the invention an external clock, preferably a conventional crystal controlled clock circuit, provides an interrupt signal to the CPU that activates a MONITOR routine at approximately 2.5 millisecond intervals. The MONITOR routine flow chart shown in FIG. 6A consists of two main parts: a sensor-sampling/updating section and a section that determines whether a "waiting" task has had its "waiting" criteria satisfied.

Figure 6A:
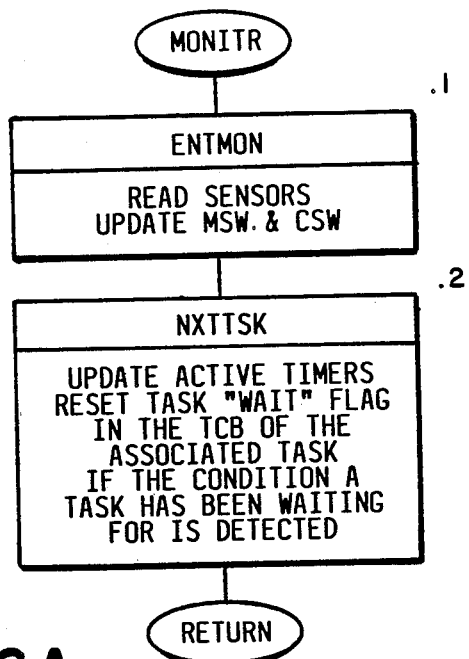
FIGS. 6A through 6D is a set of flow charts illustrating the monitor routine for the electronic postal meter in accordance with the invention.
Figure 6B:
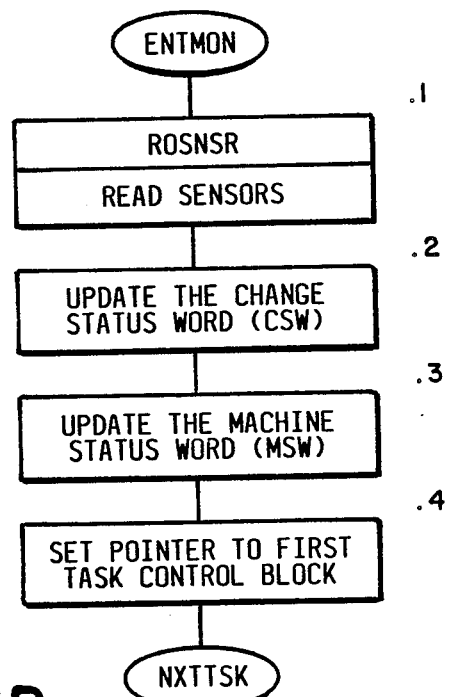

The first routine in the TASK MONITOR, ENTMON FIG. 6B obtains the current values of the machine sensors and switches inputs and outputs. The status of these elements are inserted as bit values of a Machine Status Word as illustrated graphically in FIG. 5. These values are compared with the previous reading of these devices. Any changes in bit values are stored in a Change Status Word (CSW). The current reading is saved as the Machine Status Word (MSW).

As shown in the flow chart of FIG. 6B, the routine ENTMON defines a sub-routine which is called to read and input the states of the switches, sensors and electronic gates used in the meter. The current reading of the switches, sensors and electronic gates is compared against the previous reading. Any signals that have changed state are noted by placing a logic one in the corresponding bit position in the Change Status Word. A pointer is then established to point to the first Task Control Block.

Figure 6C:
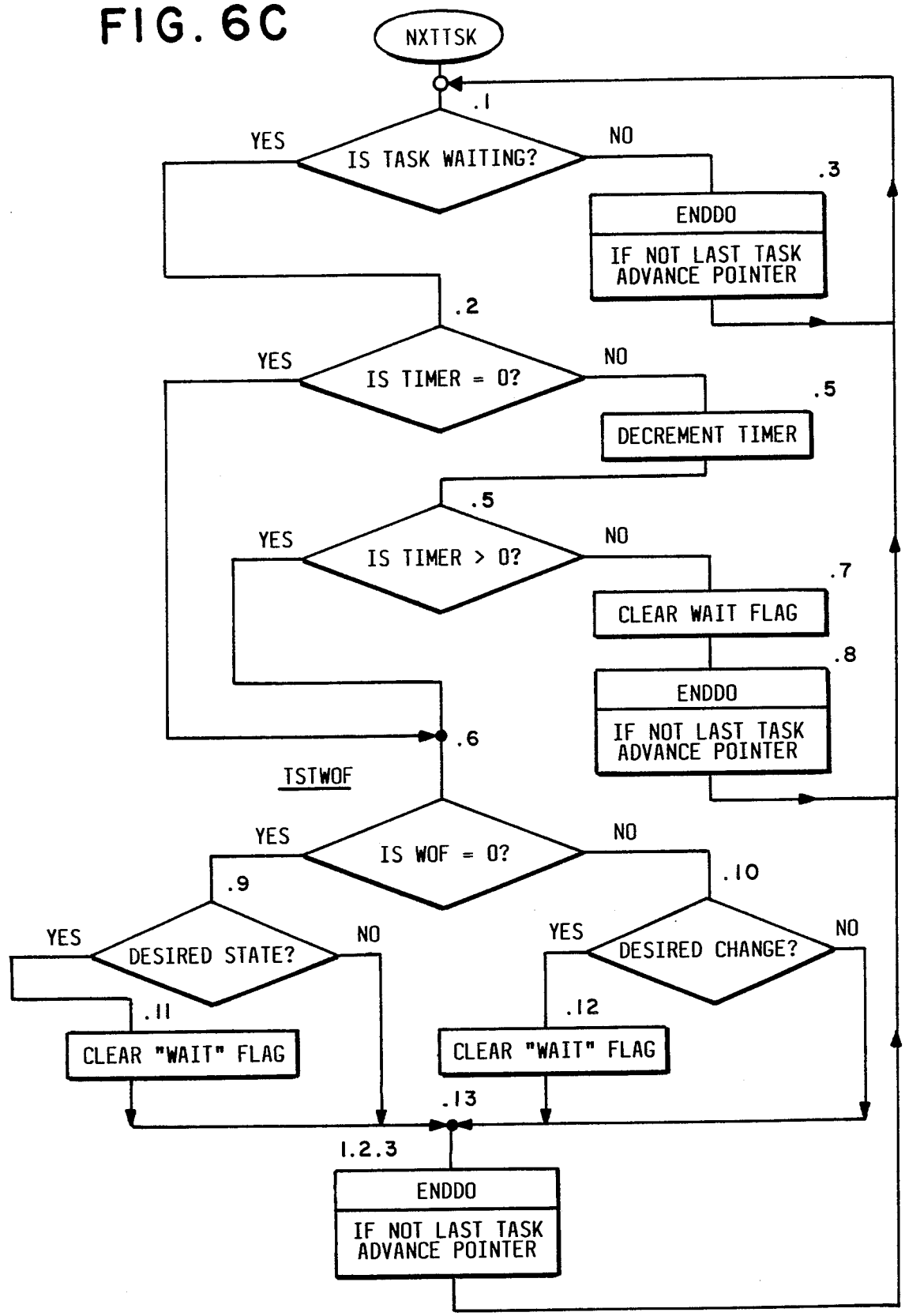
Figure 6D:
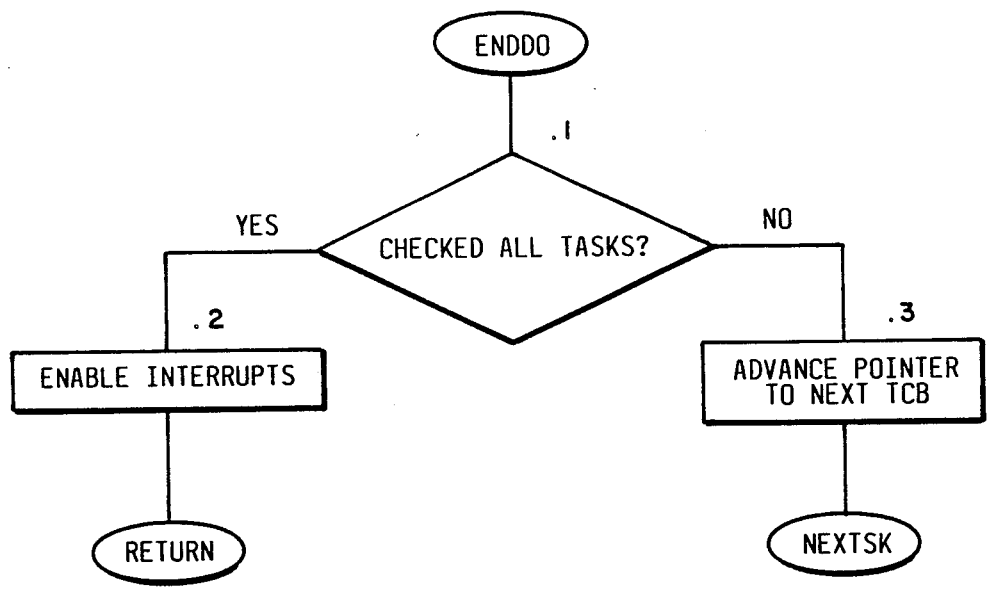

The Next Task routine (NXTTSK) FIG. 6C is used to update the "wait" status of the next task. The Task Control Blocks of all tasks are checked. Any non-zero timers in the Task Control Blocks of the tasks that are in the wait "state" are decremented. When the timer finally decrements to zero, the Task Status is changed from the "wait" state to the "active" state.

The Change Status Word is further compared against the "wait" flags of each Task Control Block that is waiting for such change to occur. When the desired change occurs, the associated Task Status is altered from the "wait" state to the "active" state. Similarly the bits in the Machine Status Word are compared against the "care" bits and "wait" flags of each Task Control Blocks where the task is waiting for a particular bit pattern to occur. If a desired match of patterns occurs the associated task is also changed from the "wait" state to the "active" state.

To determine if a task is actually waiting, the Task Waiting Flag (TWF) is checked to determine if the task associated with the current Task Control Block is waiting for a time period to transpire or for an event to occur. If the task is waiting, the associated timer is checked to be sure it is non-zero.

If the Task Waiting Flag is not set, the current Task Control Block is skipped over by advancing the pointer to the next Task Control Block. If all the Task Control Blocks have been processed, the interrupts are enabled and the monitor routine is exited. If however all the Task Control Blocks have not been processed, then the pointer is advanced to the next TCB. The program loops back to process the next Task Control Block.

The routine to decrement the timer obtains the initial value of the timer bits, and if they are non-zero decrements the timer value. However, when the timer value is zero following the decrement operation, the timer is assumed to have timed out. The "waiting" flag is cleared in the current TCB so that the task will then resume operation under the control of the task switcher module. If the timer value is greater than zero after the decrement or if the timer value was initially zero, then the timer is assumed not to be a current factor.

The "wait" option flag is then tested to determine whether the task is waiting for a change to occur or for a particular machine state to occur. To determine if a desired machine state exists, the contents of the "care" bytes word and the "wait flags" word in the current Task Control Block are compared with the current machine status word to ascertain whether the desired machine state has occurred. If a desired machine state has occurred for operation of the task, then the wait flag is cleared in the current Task Control Block so that the task can resume operation under the task switcher module routine. If however a desired change in machine state has occurred, then the wait flag is cleared in the current Task Control Block so that the task can resume operation. The pointer is then advanced to the next Task Control Block.

The specific tasks and suitable routines associated with the operation of postage meters are well described in the U.S. Pat. Nos. 3,978,457 and 4,301,507 previously incorporated by reference and will not be further described herein. It will be appreciated that the term postage meter as used herein also refers to other similar meters such as parcel registers which dispense and account for value in the form of postage.

It will be understood that the claims are intended to cover all changes and modifications of the preferred embodiment herein chosen for the purpose of illustration which do not constitute departures from the scope and spirit of the invention.

What is claimed is:

1. An electronic postage meter having a microcomputer for controlling determined tasks to be performed, means for printing postage in accordance with instructions communicated from said microcomputer, means for accounting for postage printed by said printing means, means coupled to said microcomputer for nonvolatile storage of the accounting information communicated from the microcomputer, means for providing operator-selectable data to said microcomputer, means for periodically providing to said microcomputer an interrupt signal for interrupting the current operation of the microcomputer, said microcomputer being operative upon receipt of such interrupt signal to monitor the status of at least one element of the postage meter and in response to the status thereof to schedule a queue of determined tasks to be performed by the electronic postage meter.

2. The electronic postage meter of claim 1 wherein the microcomputer stores a status word in memory corresponding to the status of the electronic postage meter element at the time the interrupt signal occurs and compares said status word to a previously stored status word to determine whether a change in the status of the electronic postage meter element has occurred.

3. An electronic postage meter comprising a microcomputer for controlling determined tasks to be performed, means for printing postage in accordance with instructions communications from said microcomputer, means for accounting for postage printed by said printing means, means for providing operator-selectable data to said microcomputer, means for providing to said microcomputer a timed interrupt signal for interrupting the current operation of the microcomputer, said microcomputer being operative upon such interrupt to monitor the status of elements of the postage meter and to schedule a queue of tasks to be performed by the electronic postage meter on the basis of such status.

4. The electronic postage meter of claim 3 wherein the monitored elements include switches.

5. The electronic postage meter of claim 3 wherein the monitored elements include sensors which are included in the means for printing postage.

6. The electronic postage meter of claim 3 wherein each said determined task is queued in accordance with an assigned multiple-bit task control block which indicates whether the task is waiting for an event to occur, what type of event it is waiting for, and the status of the task.

7. The electronic postage meter of claim 3 wherein said time interrupt signal also serves as a periodic signal for timing of a waiting state of the determined task.

* * * * *